US008222607B2

(12) United States Patent
Mann

(10) Patent No.: US 8,222,607 B2
(45) Date of Patent: Jul. 17, 2012

(54) APPARATUS FOR TIME TO DIGITAL CONVERSION

(75) Inventor: Gregory J. Mann, Wheaton, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 88 days.

(21) Appl. No.: 12/916,031

(22) Filed: Oct. 29, 2010

(65) Prior Publication Data

US 2012/0104259 A1 May 3, 2012

(51) Int. Cl.
*G01T 1/20* (2006.01)
*G04F 8/00* (2006.01)

(52) U.S. Cl. ..................... 250/362; 250/361 R; 368/120

(58) Field of Classification Search ............. 250/363.03, 250/363.04, 361 R, 362; 368/113, 120
See application file for complete search history.

(56) References Cited

U.S. PATENT DOCUMENTS

2008/0295603 A1* 12/2008 Shin et al. ........................ 73/753
2010/0283653 A1* 11/2010 Dai et al. ........................ 341/166

FOREIGN PATENT DOCUMENTS

JP 2007-041007 2/2007

* cited by examiner

*Primary Examiner* — Mark R Gaworecki

(74) *Attorney, Agent, or Firm* — Oblon, Spivak, McClelland, Maier & Neustadt, L.L.P.

(57) ABSTRACT

A time-to-digital converter device includes a first delay chain circuit that generates a first value corresponding to a time delay between a start signal and a stop signal. The time-to-digital converter device also includes at least one second delay chain circuits that generates a second value corresponding to a time delay between a delayed start signal and the stop signal. At least one delay element generates the delayed start signal by applying a predetermined delay to the start signal, and a combining circuit generates an output value based on the first and second values. In the time-to-digital converter according to the exemplary embodiments of the present advancements, the output value corresponds to the time delay between the start signal and the stop signal.

14 Claims, 5 Drawing Sheets

APPARATUS FOR TIME TO DIGITAL CONVERSION

CROSS-REFERENCE TO RELATED APPLICATIONS

None.

FIELD

The embodiments described herein relate generally to a time-to-digital converter device and associated methodology for improved measurement accuracy and resolution.

BACKGROUND

A commercial gamma ray detector includes an array of scintillator crystals coupled to a transparent light guide, which distributes scintillation light over an array of photomultiplier tubes (PMTs) arranged over the transparent light guide. Signals from the PMTs in a same area are generally summed in the analog domain, and then timing is measured based on the leading edge of the summed signal, or event.

A Time-to-Digital-Converter (TDC) is often used to measure timing in a gamma ray detector. A TDC accurately converts the realization of an event into a number than can be related to the time the event occurred. Various methods exist to perform this task. Amongst others, counting a large number of very fast logic transitions between coarse clock cycles has been used to perform this task. In some cases, it may be desirable to indicate the occurrence of a series of events known to be generated sequentially. For instance, time marks a rising signal takes to reach a pre-determined set of threshold values can be very useful information.

Time-to-digital converters (TDCs) have also been implemented with a variety of architectures. A first conventional architecture is a classic delay chain having a single chain of identical delay elements connected in series. The classic delay chain also includes a set of single bit memory elements, each connected to an output of one of the delay elements. A start signal is supplied to the input of the chain of delay elements to indicate a beginning of the time period to be measured. The start signal propagates through the chain of delay elements. The end of the time period to be measured is indicated by a stop signal that is simultaneously provided to the clock inputs of all of the memory elements in order to capture the position of the propagated start signal within the chain of delay elements. The captured position is then thermometer-decoded to compute the delay between the start and stop signals, and this delay is used to compute the length of the time period to be measured as a multiple of the delay imparted by each of the delay elements.

Therefore, the resolution of the classic delay chain is limited to the time-delay of each delay element in the delay chain. For example, if each delay element in the chain imparts a delay of "$t_u$", then the resolution of the classic delay chain is "$t_u$". As such, in a physical implementation of the classic delay chain, such as in a semiconductor device, the minimum value of $t_u$ is limited by the physical properties of the semiconductor. As sampling is performed at the same point in time for each delay element in the classic delay chain, the physical limitations on the delay $t_u$ give rise to the limits of measurement resolution.

Another conventional delay chain is the Vernier delay chain. As in the classic delay chain, the Vernier delay chain includes a chain of identical delay elements connected in series and a set of single bit memory elements, each connected to the output of one of the delay elements. However, the Vernier delay chain also includes a second delay chain of identical delay elements connected in series. The output of each of the delay elements in the second delay chain is connected to a clock input of one of the memory elements. Further, the delays elements in the first delay chain each impart a delay of $t_u$, and the delay elements of the second delay chain each impart a delay of $t_c$, where $t_c<t_u$.

In operation, the start signal is supplied to the first delay chain of the Vernier delay chain, and the stop signal is supplied to the second delay chain. As the delay imparted by the elements of the second delay chain is less than that of the elements of the first delay chain, the stop signal will eventually overtake the start signal. When the stop signal overtakes the start signal, the propagation of the start signal in the first delay chain is captured by the memory elements and thermometer-decoded to determine the time interval between the start and stop signals. The time period to be measured is then calculated as a multiple of the difference between the delays of the first delay chain and the delays of the second delay chain, or $t_u-t_c$.

As with the classic delay chain, the delays in the Vernier delay chain are limited by the physical properties of the semiconductor device on which it is implemented. Therefore, there is a minimum delay difference ($t_u-t_c$) (i.e. resolution) that can be achieved using the Vernier delay chain. Thus, it is difficult to make precise time period measurements using the Vernier delay chain.

Accordingly, a need exists for an apparatus and associated methodology that improves upon the limitations of the classic and Vernier delay chains, and that achieves improved accuracy and resolution.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION

In general, time-to-digital converter device according to exemplary embodiments of the present advancements includes a first delay chain circuit that generates a first value corresponding to a time delay between a start signal and a stop signal. The time-to-digital converter device also includes at least one second delay chain circuits that generates a second value corresponding to a time delay between a delayed start signal and the stop signal. At least one delay element generates the delayed start signal by applying a predetermined delay to the start signal, and a combining circuit generates an output value based on the first and second values. In the time-to-digital converter according to the exemplary embodiments of the present advancements, the output value corresponds to the time delay between the start signal and the stop signal.

Figure 1:
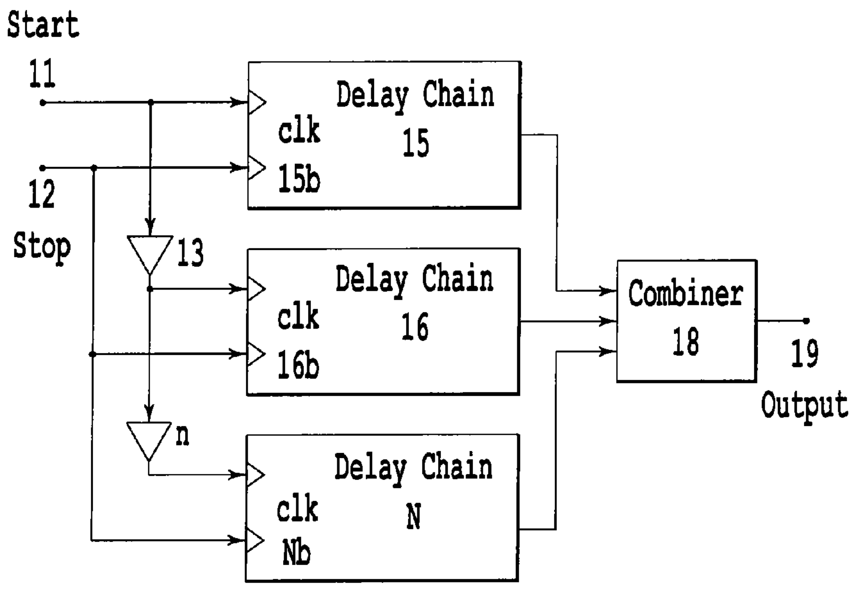
FIG. 1 is a schematic drawing of a time-to-digital converter device according to an exemplary embodiment of the present advancements.

Referring now to the drawings, wherein like reference numerals designate identical or corresponding parts throughout the several views, FIG. 1 is a schematic drawing of a time-to-digital converter device according to an exemplary embodiment of the present advancements. In FIG. 1, multiple delay chains 15 . . . N are connected to terminal 11 to receive a start signal, and to terminal 12 to receive a stop signal. Clock inputs 15*b*, 16*b* . . . Nb of delay chains 15, 16 . . . N are directly connected to terminal 12, but only delay chain 15 is directly connected to terminal 11. Delay chain 16 is connected to terminal 11 via delay element 13, and delay chain N is connected to terminal 11 via delay elements 13 through n. The outputs of delay chains 15, 16 . . . N are connected to combiner 18, which generates an overall output of the time-to-digital converter device and provides the overall output to terminal 19.

Further, in FIG. 1, each delay chain 15, 16 . . . N have a substantially similar structure and a similar resolution, as will be described in detail below. Delay elements 13 . . . n provide substantially the same delay amount as a function of the resolution of delay chains 15, 16 . . . N. For example, if each delay chain has a resolution of "R", each delay element 13 . . . n provides a delay amount of R/N, and as a result, the overall resolution of the time-to-digital converter device is R/N.

As one of ordinary skill in the art would recognize, the time-to-digital converter device of FIG. 1 may include any number of delay chains 15, 16 . . . N, and a corresponding number of delay elements 13 . . . n. Further, combiner 18 may be a single combiner with sufficient inputs to accommodate all delay chains 15, 16 . . . N included in the time-to-digital converter, or may be implemented as a series of cascaded combiners, which in the aggregate have sufficient inputs to accommodate all of the delay chains 15, 16 . . . N. Combiner 18 may also combine the outputs of delay chains 15, 16 . . . N by addition or may average the outputs of delay chains 15, 16 . . . N. Any other combination of outputs of delay chains 15, 16 . . . N in combiner 18 is also possible as one of ordinary skill in the art would recognize.

The time-to-digital converter device of FIG. 1 may be implemented as discrete logic gates, as an Application Specific Integrated Circuit (ASIC), a Field Programmable Gate Array (FPGA) or other Complex Programmable Logic Device (CPLD). An FPGA or CPLD implementation, the time-to-digital converter may be coded in VHDL, Verilog or any other hardware description language as a set of computer-readable instructions, and the computer-readable instructions may be stored in electronic memory directly in the FPGA or CPLD, or as separate electronic memory. Further, the electronic memory may be non-volatile, such as a ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Figure 2:
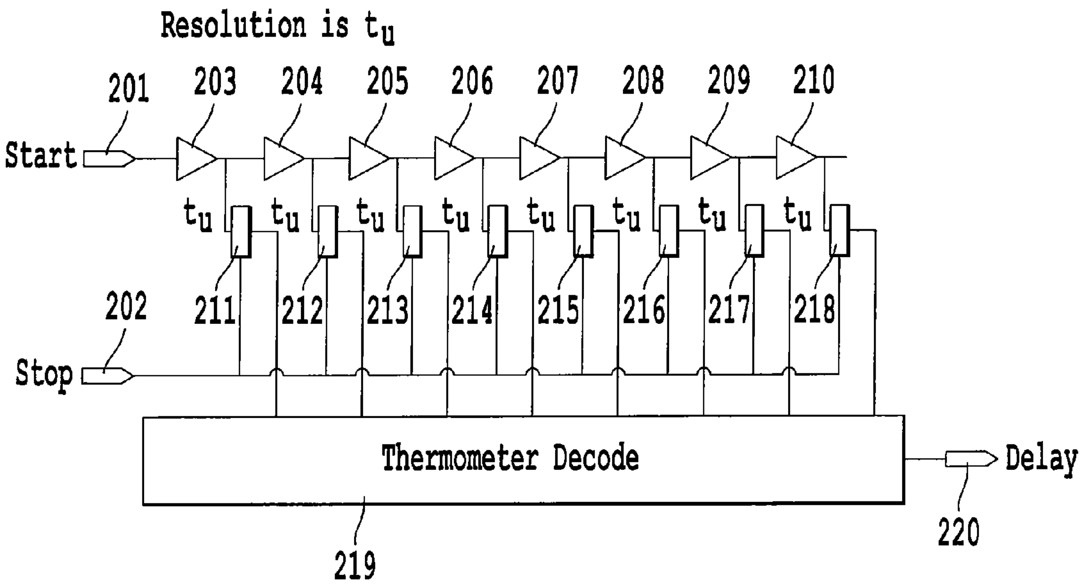
FIG. 2 is a schematic drawing of a delay chain used in a time-to-digital converter device according to an exemplary embodiment of the present advancements.

FIG. 2 is a schematic diagram of an exemplary delay chain structure for delay chains 15, 16 . . . N. In FIG. 2, a plurality of delay chain elements 203 . . . 210 are connected in series with terminal 201. Each of the delay chain elements 203 . . . 210 impart the same delay, for example, a delay $t_u$. A single-bit memory element 211 . . . 218 is connected to the output of each one of the delay chain elements 203 . . . 210, and the clock inputs of the memory elements are connected in common to terminal 202. The outputs of the memory elements 211 . . . 218 are connected to a thermometer decoder circuit 219 whose output corresponds to the output of the delay chain.

Though eight delay chain elements 203 . . . 210 are shown in FIG. 2, one of ordinary skill in the art would recognize that a delay chain having more than eight delay chain elements or fewer than eight delay chain elements are possible without departing from the scope of the present advancements. In addition, though positive logic elements are shown in FIG. 2, one of ordinary skill in the art would recognize as being within the scope of the present advancements an implementation of the delay chain of FIG. 2 using negative logic elements. Further, as thermometer circuits are known, a description of the thermometer circuit 219 is omitted for the sake of brevity.

In operation, the start signal is provided to the terminal 201 of FIG. 2 at the start of the time period to be measured. The start signal then propagates through the delay chain elements 203 . . . 210, where each delay element delays the start signal by $t_u$. A stop signal indicating the end of the time period to be measured is applied to the clock inputs of each of the memory elements 211 . . . 218 via the terminal 202. The outputs of the memory elements 211 . . . 218 are then provided to the thermometer decoder 219, which generates a value indicative of the time period to be measured and provides the value to terminal 220.

As one of ordinary skill in the art will recognize, propagation of the start signal through the delay chain elements 203 . . . 210 is measured at the delay boundaries. In other words, the propagated start signal is sampled at the outputs of each of the delay chain elements 203 . . . 210. Thus, the start signal is captured after an integer number of delays $t_u$ imparted by the delay chain elements 203 . . . 210. Fractions of $t_u$ are not measured. As such the resolution of the delay chain in FIG. 2 is the delay amount imparted by each delay chain element 203 . . . 210 or $t_u$.

Figure 3:
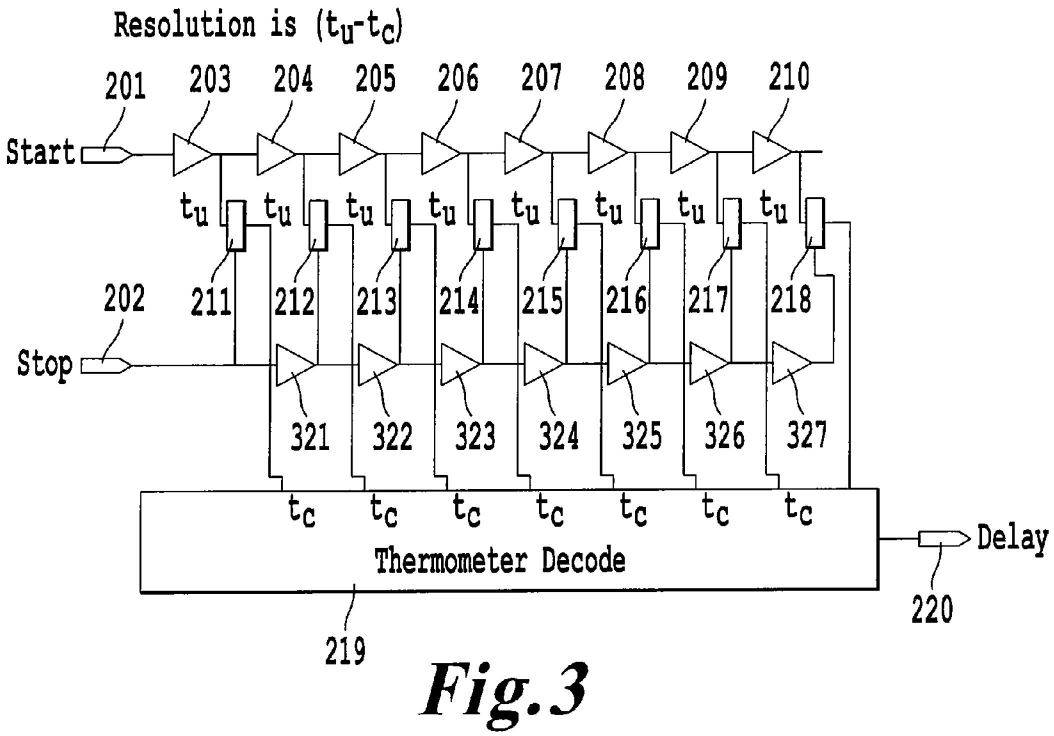
FIG. 3 is a schematic drawing of another delay chain used in a time-to-digital converter according to an exemplary embodiment of the present advancements.

FIG. 3 is a schematic diagram of another exemplary delay chain structure for delay chains 15, 16 . . . N. In FIG. 3, delay chain elements 203 . . . 210 are connected in series with terminal 201, and the outputs of delay chain elements 203 . . . 210 are sampled by single-bit memory elements 211 . . . 218. The outputs of memory elements 211 . . . 218 are connected to a thermometer decoder 219. As the delay chain elements 203 . . . 210, memory elements 211 . . . 218 and thermometer decoder 219 were described with reference to FIG. 2 above, further description of these elements is omitted for brevity.

In FIG. 3, delay elements 321 . . . 327 are connected in series between terminal 202 and the clock inputs of memory elements 211 . . . 218. Specifically, the clock input of memory element 211 is directly connected to terminal 202, the clock input of memory element 212 is connected to terminal 202 via delay element 321, the clock input of memory element 213 is connected to terminal 202 via delay element 321 and delay element 322, and so on. Thus, the clock input of memory element 218 is connected to terminal 202 via all of the delay elements 321 . . . 327. Each of the delay elements 321 . . . 327 in FIG. 3 impart the same delay amount of $t_c$, which is less than the delay $t_u$ imparted by delay chain elements 203 . . . 210.

In operation, the start signal is applied to delay chain elements 203 . . . 210 via terminal 201 at the beginning of the time period to be measured and the stop signal is applied to the terminal 202 at the end of the time to be measured. The start signal propagates through the delay chain elements 203 . . . 210, and the stop signal propagates through the delay chain elements 321 . . . 327. As the delay of delay elements 321 . . . 327 is less than the delay of delay chain elements 203 . . . 210, the stop signal will eventually overtake the start signal. When the propagation of the stop signal arrives at the output of delay element 327, the outputs of memory elements 211 . . . 218 are provided to the thermometer decoder 219, and a resulting output representative of the time period to be measured is provided to terminal 220. The delay chain of FIG. 3 has a resolution of $t_u - t_c$.

As with FIG. 2, one of ordinary skill in the art will recognize that the delay chain of FIG. 3 may be implemented with fewer or more delay chain elements 203 . . . 210 and associated memory elements 211 . . . 218 and delay elements 321 . . . 327 without departing from the scope of the present advancements.

Next an exemplary implementation of the time-to-digital converter circuit will be described with reference to FIG. 4. The time-to-digital converter device of FIG. 4 includes two delay chains 42 and 43. The delay chains 42 and 43 may both be either the delay chain of FIG. 2 or the delay chain of FIG. 3 described above. Of course, one of ordinary skill in the art will recognize that other delay chain structures are possible without departing from the scope of the present advancements.

Figure 4:
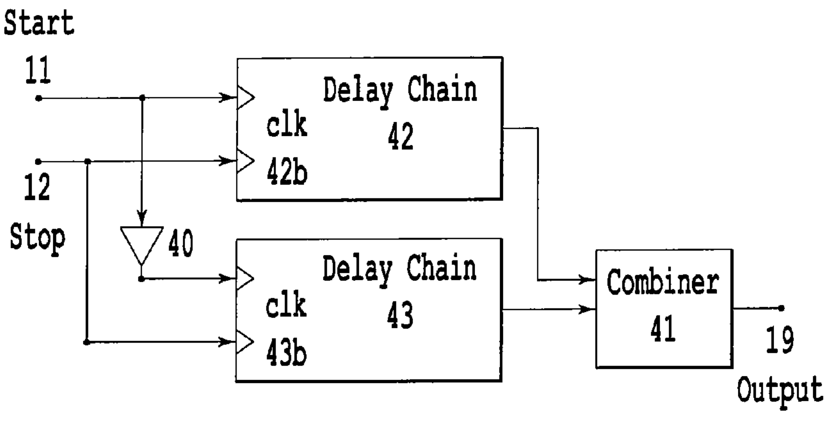
FIG. 4 is a schematic drawing of another time-to-digital converter device according to an exemplary embodiment of the present advancements.

In FIG. 4, delay chain 42 is directly connected to terminal 11, while delay chain 43 is connected to terminal 11 via delay element 40. Further, delay element 40 provides a delay equal to $t_u/2$ in the event that the delay chain of FIG. 2 is used as delay chains 42 and 43, and the delay element 40 provides a delay of $(t_u - t_c)/2$ in the event that the delay chain of FIG. 3 is used as delay chains 42 and 43.

Terminal 12 is directly connected to the clock inputs **42*b* and 43*b* of delay chains 42 and 43 respectively. The outputs of delay chains 42 and 43 are combined in combiner 41 and provided to output terminal 19**.

Next, the operation of the time-to-digital conversion device of FIG. 4 is described with reference to the flow chart of FIG. 5. At step S1 in FIG. 5, the start signal is applied to terminal 11, which provides the start signal to delay chain 42 and delay element 40. After the delay of delay element 40 has elapsed, the start signal is also provided to delay chain 43. As such, the start signal propagates through delay chain 42 and 43 at an equal rate, but the start signal is delayed, or offset, in delay chain 43 by a delay of delay element 40.

Figure 5:
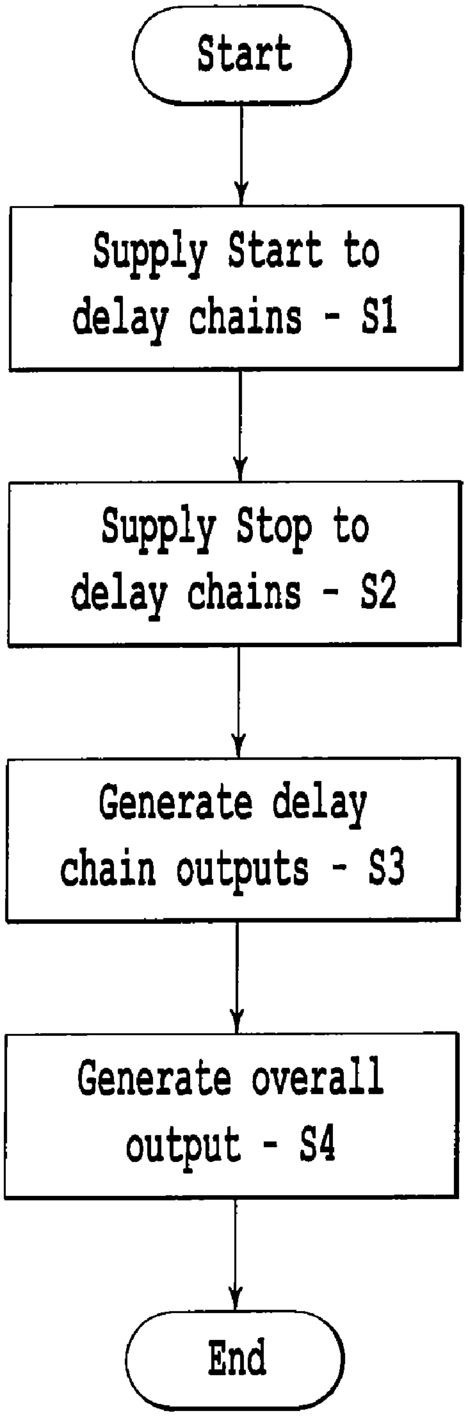
FIG. 5 is a flowchart of a time-to-digital conversion method according to an exemplary embodiment of the present advancements.

At step S2 in FIG. 5, the stop signal is supplied to terminal 12, and thereby to delay chains 42 and 43 simultaneously. As S3, the location of the start signal in the respective delay chains is processed as described above with respect to FIGS. 2 and 3, and each delay chain 42 and 43 provides a corresponding output to combiner 41. Combiner 41 then combines the outputs of delay chains 42 and 43 into an overall output of the time-to-digital converter at step S4.

Figure 6:
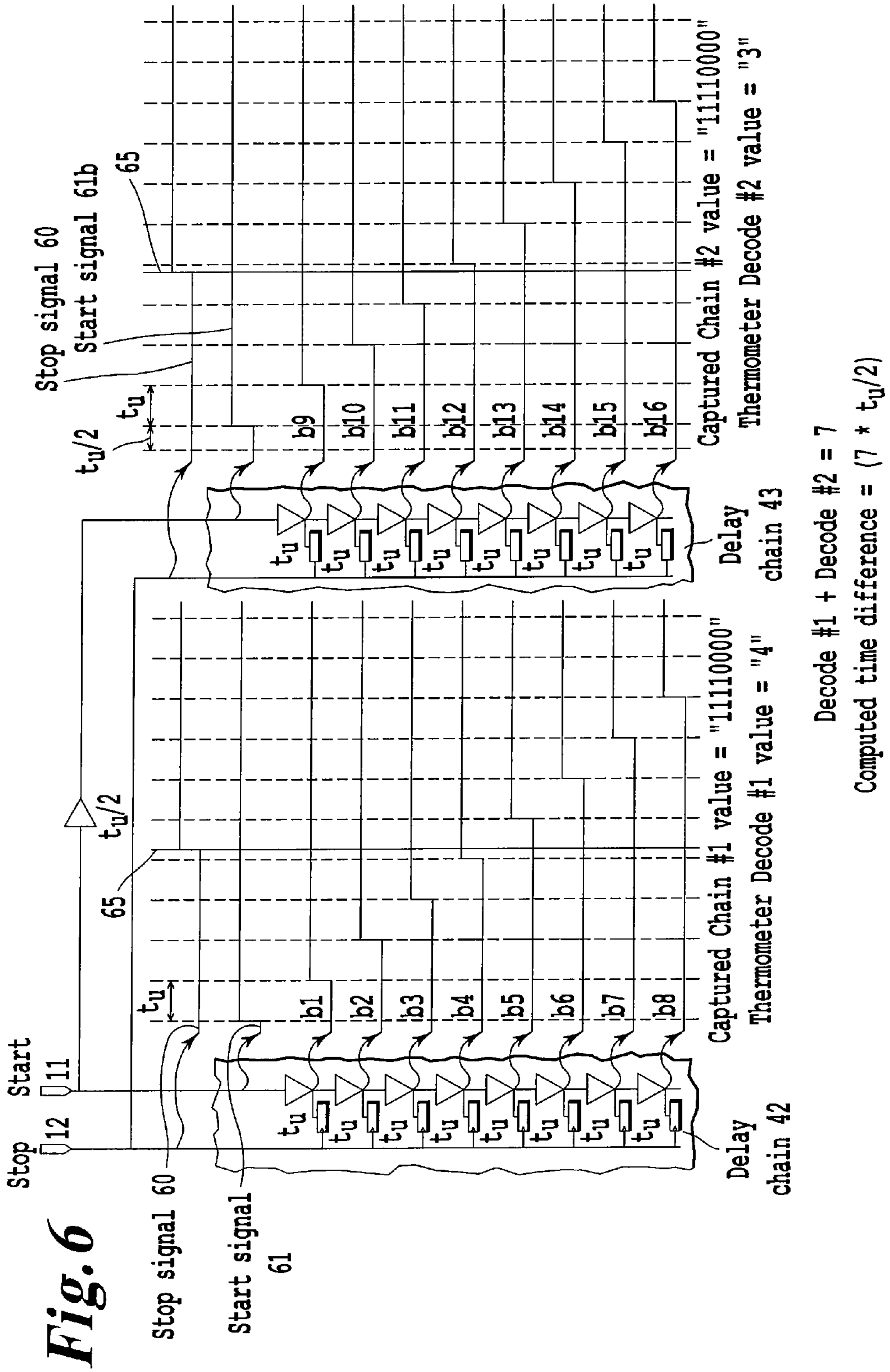
FIG. 6 is a timing diagram of time-to-digital conversion according to an exemplary embodiment of the present advancements.

Next, the timing diagram of FIG. 6 will be described. FIG. 6 is a timing diagram of the process described above with reference to FIGS. 4 and 5. In FIG. 6, delay chain 43 receives the start signal 61 after a delay of $t_u/2$, while delay chain 42 receives the start signal 61 without delay. As the start signal 61 propagates through delay chain 42, the output of each delay element b1 . . . b8 transitions from a "low" state to a "high" state. After the delay of $t_u/2$ imparted by the delay element 40, the start signal **61*b* propagates through delay chain 43 causing the output b9 . . . b16** of each of the delay chain elements therein to transition from a low to a high state.

At a predetermined time, a stop signal 60 is applied to stop terminal 12. The stop signal 60 is directly applied to both delay chains 42, 43 without delay. At time 65, the stop signal causes the delay chains to "capture" the current value of each of their respective delay chain elements b1 . . . b16. For example, at time 65 b1 . . . b4 are high and b5 . . . b8 are low in delay chain 42, while b9 . . . b11 are high and b12 . . . b16 are low in delay chain 43. Thus, the captured chain value for delay chain 42 is "11110000", or four, and the captured value for delay chain 43 is "11100000" or three. The computed time difference is then the sum of these values divided by the delay imparted by delay element 40.

As can be appreciated, the delay chains 42, 43, start signals 61, **61*b* and stop signal 60 in FIG. 6 are exemplary, and other values and configurations are possible. For example, other levels and relative timings among the signals are possible without departing from the scope of the present advancements. Likewise, FIG. 6** is illustrated in positive logic wherein a larger, positive voltage indicates a logic "high" and a zero or smaller voltage indicates a logic "low." However, negative logic, wherein a small or zero voltage denotes a logic "high" and a large, positive voltage denotes a logic "low" can also be used.

Figure 7:
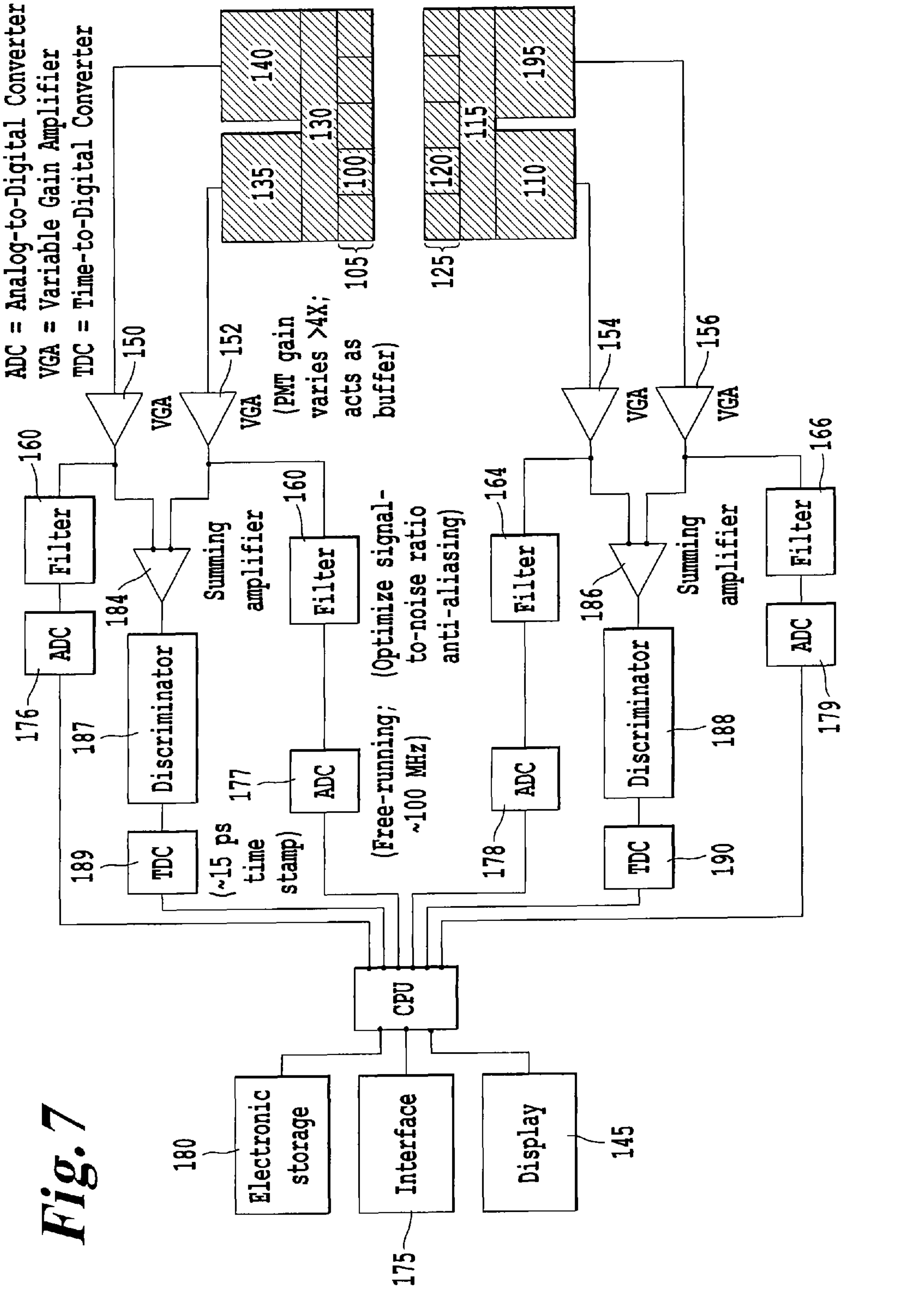
FIG. 7 is a schematic drawing of a gamma ray detection system according to an exemplary embodiment of the present advancements.

Next, a gamma ray detection system according to an exemplary embodiment of the present advancements is described with reference to FIG. 7. In FIG. 7, photomultiplier tubes 135 and 140 are arranged over light guide 130, and the array of scintillation crystals 105 is arranged beneath the light guide 130. A second array of scintillation crystals 125 is disposed opposite the scintillation crystals 105 with light guide 115 and photomultiplier tubes (PMTs) 195 and 110 arranged thereover.

In FIG. 7, when gamma rays are emitted from a body under test (not shown), the gamma rays travel in opposite directions, approximately 180° from each other. Gamma ray detection occurs simultaneously at scintillation crystals 100 and 120, and a scintillation event is determined when the gamma rays are detected at scintillation crystals 100 and 120 within a predefined time limit. Thus, the gamma ray timing detection system detects gamma rays simultaneously at scintillation crystals 100 and 120. However, for simplicity only, gamma ray detection is described relative to scintillation crystal 100. One of ordinary skill in the art will recognize, however, that the description given herein with respect to scintillation crystal 100 is equally applicable to gamma ray detection at scintillation crystal 120.

Each photomultiplier tube 110, 135, 140 and 195 is respectively connected to variable gain amplifiers, or VGA, 150, 152, 154, and 156. The VGAs 150, 152, 154 and 156 act as signal buffers and allow the acquisition system to be adjusted to accommodate variation in PMT gain, such as occurs naturally as part of the PMT manufacturing process and occurs due to aging of the PMTs. The signal output from each VGA 150, 152, 154 or 156 is split into two separate electronic paths.

One electronics path for is used for measuring the arrival time of the gamma ray. The signal for this path is typically formed by summing two or more signals from the same detector in a summing amplifier 184 or 186. The act of summing multiple signals from the same detector can improve the signal to noise ratio for the timing estimate and reduce the number of required electronic components. After summing, the signal is passed to a discriminator 187 or 188. The discriminator 187 or 188, which typically has an adjustable threshold, produces a precisely timed electronic pulse when the summed signal passes the threshold setting. The output of the discriminator triggers a time-to-digital converter, or TDC, 189 and 190. The TDC 189 or 190 produces a digital output which encodes the time of the discriminator pulse relative to a system clock (not shown). For a time-of-flight PET system, the TDC 189 or 190 typically produces a time stamp with an accuracy of 15 to 25 ps.

For each PMT 110, 135, 140 and 195 there is an independent electronics path which is used to measure the amplitude of the signal on each PMT 110, 135, 140 and 195. This path consists of a filter 160, 162, 164, 166 and an analog to digital converter, or ADC, 176, 177, 178, 179. The filter 160, 162, 164 or 166, typically a bandpass filter, is used to optimize the signal to noise ratio of the measurement and performs an anti-aliasing function prior to conversion to a digital signal by the ADC 176, 177, 178 or 179. The ADC 176, 177, 178 or 179 can be a free-running type, running at 100 MHz, for example, in which case the central processing unit, or CPU, 170, performs a digital integration, or the ADC can be a peak-sensing type. The ADC and TDC outputs are provided to a CPU, 170, for processing. The processing consists of estimating an energy and position from the ADC outputs and an arrival time from the TDC output for each event, and may include the application of a many correction steps, based on prior calibrations, to improve the accuracy of the energy, position, and time estimates.

As one of ordinary skill in the art would recognize, the CPU 170 can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU 170 may be implemented as a set of computer-readable instructions stored in any of the above-described electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art.

Once processed by the CPU 170, the processed signals are stored in electronic storage 180, and/or displayed on display 145. As one of ordinary skill in the art would recognize, electronic storage 180 may be a hard disk drive, CD-ROM drive, DVD drive, FLASH drive, RAM, ROM or any other electronic storage known in the art. Display 145 may be implemented as an LCD display, CRT display, plasma display, OLED, LED or any other display known in the art. As such, the descriptions of the electronic storage 180 and the display 145 provided herein are merely exemplary and in no way limit the scope of the present advancements.

FIG. 7 also includes an interface 175 through which the gamma ray detection system interfaces with other external devices and/or a user. For example, interface 175 may be a USB interface, PCMCIA interface, Ethernet interface or any other interface known in the art. Interface 175 may also be wired or wireless and may include a keyboard and/or mouse or other human interface devices known in the art for interacting with a user.

In the above descriptions, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A time-to-digital converter device, comprising:

a first delay chain circuit configured to generate a first value corresponding to a time delay between a start signal and a stop signal;

at least one second delay chain circuit configured to generate a second value corresponding to a time delay between a delayed start signal and the stop signal;

at least one delay element configured to generate the delayed start signal by applying a predetermined delay to the start signal; and a combining circuit configured to generate an output value based on the first and second values, the output value corresponding to the time delay between the start signal and the stop signal.

2. The time-to-digital converter device, according to claim 1, wherein each of the first and the at least one second delay chain circuits includes a delay chain having a plurality of delay chain elements, each delay chain element providing a same predetermined delay, the start signal being provided to the delay chain;

a plurality of memory elements, each connected to one of the plurality of delay elements in the delay chain, the plurality of memory elements having a common clock input to receive the stop signal; and a decoder circuit configured to generate digital values based on outputs of the plurality of memory elements.

3. The time-to-digital converter device according to claim 2, wherein the decoder circuit is a thermometer decoder.

4. The time-to-digital converter device according to claim 2, wherein the predetermined delay of the delay element is inversely proportional to a number of delay chain circuits included in the time-to-digital converter device.

5. The time-to-digital converter device according to claim 1, wherein each of the first and the at least one second delay chain circuit are Vernier time-to-digital conversion circuits.

6. The time-to-digital converter device according to claim 1, wherein the combining circuit is an adder.

7. The time-to-digital converter device according to claim 1, wherein the combining circuit is an averager.

8. A method of improving the resolution of a time-to-digital converter device, comprising:

generating, at a first time-to-digital converter, a first value indicating a time delay between a start signal and a stop signal;

delaying the start signal by at least one predetermined delay;

generating at least one second value indicating a time delay between the delayed start signal and the stop signal; and combining the first and second values into an output value indicative of the time delay between the start signal and the stop signal.

9. The method according to claim 8, wherein each of generating the first value and generating the at least one second value includes delaying the start signal in a delay chain including a plurality of delay chain elements;

capturing outputs of each of the delay chain elements in a plurality of memory elements in response to the stop signal; and generating digital values based on outputs of the plurality of memory elements.

10. The method according to claim 9, wherein the digital values are generated according to a thermometer decoder algorithm.

11. The method according to claim 9, wherein the delaying step includes delaying the start signal by an inverse number of first and second values to be generated.

12. The method according to claim 8, wherein the combining step includes adding the first and second values.

13. The method according to claim 8, wherein the combining step includes averaging the first and second values.

14. A gamma ray detection system, comprising:

a plurality of scintillation crystals configured to generate scintillation light in response to interaction with a gamma ray;

a plurality of photomultiplier tubes arranged to detect the scintillation light generated by the scintillation crystals, the plurality of photomultiplier tubes generating a detection signal in response to detection of the scintillation light;

a time-to-digital converter configured to determine a time of arrival of the gamma ray, the time-to-digital converter including a first delay chain circuit configured to generate a first value corresponding to a time delay between a start signal and a stop signal corresponding to edges of the detection signal, at least one second delay chain circuits configured to generate a second value corresponding to a time delay between a delayed start signal and the stop signal, at least one delay element configured to generate the delayed start signal by applying a predetermined delay to the start signal, and a combining circuit configured to generate an output value based on the first and second values, the output value corresponding to the time of arrival of the gamma ray.

* * * * *